(12) United States Patent
Lynch

(10) Patent No.: US 9,006,919 B2
(45) Date of Patent: Apr. 14, 2015

(54) ADAPTIVE HYDROKINETIC ENERGY HARVESTING SYSTEM

(76) Inventor: Gerard J. Lynch, Bridgewater, NJ (US)

(*) Notice: Subject to any disclaimer, the term of this patent is extended or adjusted under 35 U.S.C. 154(b) by 587 days.

(21) Appl. No.: 13/412,709

(22) Filed: Mar. 6, 2012

(65) Prior Publication Data
US 2012/0230021 A1    Sep. 13, 2012

Related U.S. Application Data

(60) Provisional application No. 61/450,270, filed on Mar. 8, 2011.

(51) Int. Cl.
F03B 13/00  (2006.01)
H02P 9/04   (2006.01)
(Continued)

(52) U.S. Cl.
CPC .......... *H02N 2/185* (2013.01); *F03B 17/06* (2013.01); *F03D 5/00* (2013.01); *H02N 2/181* (2013.01); *H02P 9/04* (2013.01); *Y02E 10/28* (2013.01); *Y02E 10/70* (2013.01)

(58) Field of Classification Search
CPC ....... Y02E 10/32; Y02E 10/721; Y02E 10/34; Y02E 10/226; Y02E 10/28; Y02E 10/223; Y02E 10/70; F03B 12/00; F03B 12/10; F03B 13/264; F03B 13/105; F03B 3/121; F03B 3/126; F03B 17/061; H02P 9/04; F05B 2210/404; F05B 2220/32; F05B 2240/301; F05B 2240/97; F05B 2210/16; B63B 1/24; B63B 35/73; B63B 1/28; B63B 35/815; B63B 2039/065; B63B 35/7923; A63B 35/02; A01K 81/00; A01K 81/04; H02G 1/10; H02N 2/185; F04D 29/38; F04D 29/30; F04D 29/666; E02B 2017/0091; F03D 1/0641; F03D 1/065; F03D 1/0675; F03D 1/0633; B64C 27/463; B64C 27/467; F01D 5/24; F05D 2250/185
USPC ........ 322/3; 114/274, 61.12, 273; 290/54, 43, 290/42, 50; 441/64; D12/309, 324; 29/889.71, 428, 889.12; 30/57, 50; 473/576, 586; 415/3.1, 2.1, 4.1; 416/132 R, 223 R
See application file for complete search history.

(56) References Cited

U.S. PATENT DOCUMENTS 2,008,234 A * 7/1935 Weeks .................... 416/233
2,895,063 A   7/1959 Morris
(Continued)

OTHER PUBLICATIONS

Flutter-Mill: a New Energy-Harvesting Device, by Liaosha Tang, Michael P. Païdoussis and James D. DeLaurier, University of Toronto Institute for Aerospace Studies, Department of Mechanical Engineering, McGill University, viewed at http://ontario-sea.org/storage/26/1817_Flutter-Mill-_a_New-Energy-Harvesting_Device.pdf (publication date not known) (10 pages).

(Continued)

*Primary Examiner* — Tulsidas C Patel
*Assistant Examiner* — Charles Reid, Jr.
(74) *Attorney, Agent, or Firm* — Greenberg Traurig, LLP

(57) ABSTRACT

An adaptive system for harvesting hydrokinetic energy from flowing fluid uses a hydrofoil-type vane in a flow-way and an electrical power generator to convert torque generated by the oscillating vane to electrical current. The generator may be electromagnetic or piezoelectric. The system includes a control module that measures the oscillation of the vane, the generated torque, or the characteristics of the generated current, and modifies the resistance of the vane or the conversion of the electrical current in response to changes therein. Some systems include a frame that can be anchored in a body of water. Some systems are portable and provide illumination. Some systems are adapted for use as hiking or camping gear and may be inserted into stream beds or used as walking sticks. Some systems are in-line devices. Some systems are adapted as fishing lures.

7 Claims, 15 Drawing Sheets

(51) Int. Cl.
*H02N 2/18* (2006.01)
*F03B 17/06* (2006.01)
*F03D 5/00* (2006.01)

(56) References Cited

U.S. PATENT DOCUMENTS

| | | | |
|---|---|---|---|
| 3,663,845 A | 5/1972 | Apstein | |
| 3,799,205 A | 3/1974 | Fisher et al. | |
| 3,978,345 A * | 8/1976 | Bailey | 290/54 |
| 3,995,972 A * | 12/1976 | Nassar | 416/68 |
| 4,024,409 A | 5/1977 | Payne | |
| 4,150,301 A * | 4/1979 | Bergey, Jr. | 290/44 |
| 4,163,905 A * | 8/1979 | Davison | 290/54 |
| 4,184,805 A | 1/1980 | Arnold | |
| 4,191,893 A | 3/1980 | Grana et al. | |
| 4,274,009 A * | 6/1981 | Parker, Sr. | 290/43 |
| 4,347,036 A * | 8/1982 | Arnold | 416/1 |
| 4,348,594 A | 9/1982 | Lipfert | |
| 4,387,318 A * | 6/1983 | Kolm et al. | 310/330 |
| 5,299,107 A * | 3/1994 | Ratcliffe et al. | 362/158 |
| 5,324,169 A * | 6/1994 | Brown et al. | 416/83 |
| 5,548,956 A | 8/1996 | Price | |
| 6,153,944 A | 11/2000 | Clark | |
| 6,273,680 B1 | 8/2001 | Arnold | |
| 6,424,079 B1 | 7/2002 | Carroll | |
| 6,481,148 B1 * | 11/2002 | Lindgren | 43/17.5 |
| 6,731,018 B1 | 5/2004 | Grinsted et al. | |
| 6,752,595 B2 * | 6/2004 | Murakami | 416/87 |
| 6,849,963 B2 | 2/2005 | Grinsted et al. | |
| 7,199,480 B2 | 4/2007 | Fripp et al. | |
| 7,208,845 B2 | 4/2007 | Masters et al. | |
| 7,224,077 B2 | 5/2007 | Allen | |
| 7,252,431 B1 * | 8/2007 | Caramanna | 374/147 |
| 7,291,936 B1 * | 11/2007 | Robson | 290/43 |
| 7,311,496 B1 | 12/2007 | Steinbrecher | |
| 7,383,659 B1 * | 6/2008 | Honkanen | 43/26.2 |
| 7,573,143 B2 | 8/2009 | Frayne | |
| 7,607,862 B2 | 10/2009 | Thorsbakken | |
| 7,626,281 B2 | 12/2009 | Kawai | |
| 7,632,069 B2 | 12/2009 | Kelley | |
| 7,633,175 B1 | 12/2009 | Wilson, III et al. | |
| 7,905,705 B2 | 3/2011 | Kelley | |
| 8,541,927 B2 * | 9/2013 | Hayamizu | 310/339 |
| 2002/0104250 A1 * | 8/2002 | West | 43/17.1 |
| 2003/0066934 A1 * | 4/2003 | Bolonkin | 244/153 R |
| 2003/0185666 A1 * | 10/2003 | Ursua | 415/4.2 |
| 2005/0132700 A1 * | 6/2005 | Newman | 60/398 |
| 2005/0230974 A1 | 10/2005 | Masters et al. | |
| 2006/0010763 A1 * | 1/2006 | Podlewski et al. | 43/17.6 |
| 2007/0176430 A1 | 8/2007 | Hammig | |
| 2008/0048455 A1 | 2/2008 | Carney | |
| 2008/0277941 A1 | 11/2008 | Bowles et al. | |
| 2009/0091135 A1 * | 4/2009 | Janca et al. | 290/54 |
| 2009/0134623 A1 * | 5/2009 | Krouse | 290/43 |
| 2009/0134631 A1 | 5/2009 | Guerrero et al. | |
| 2009/0295163 A1 | 12/2009 | Frayne | |
| 2009/0302612 A1 | 12/2009 | Gartner | |
| 2010/0060008 A1 * | 3/2010 | Hostetler | 290/54 |
| 2010/0104435 A1 * | 4/2010 | Arlitt et al. | 416/1 |
| 2010/0264660 A1 * | 10/2010 | Suzuki | 290/54 |
| 2010/0295302 A1 * | 11/2010 | Martin | 290/43 |

OTHER PUBLICATIONS

Propulsion of a Flapping and Oscillating Airfoil, by I.E. Garrick, Langley Memorial Aeronautical Laboratory, National Advisory Committee for Aeronautics, Langley Field, Virginia, May 4, 1936 (9 pages).

* cited by examiner

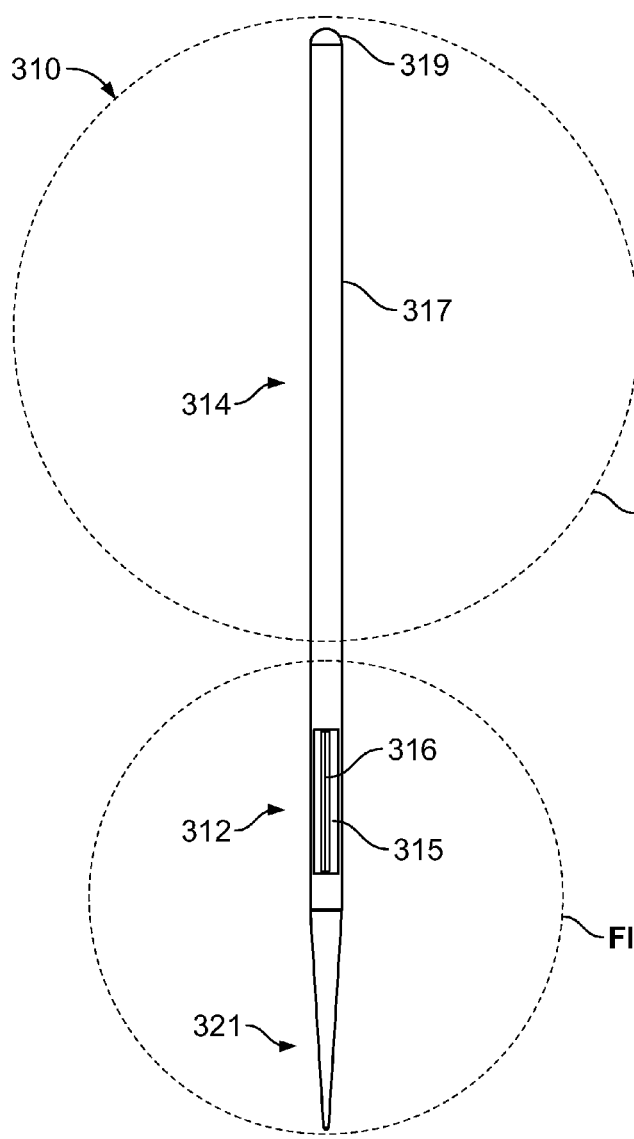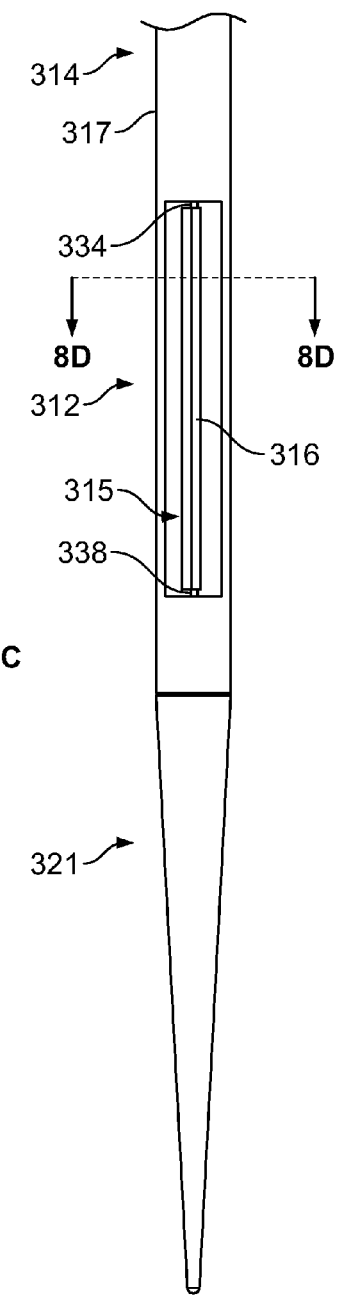
FIG. 8A
FIG. 8B

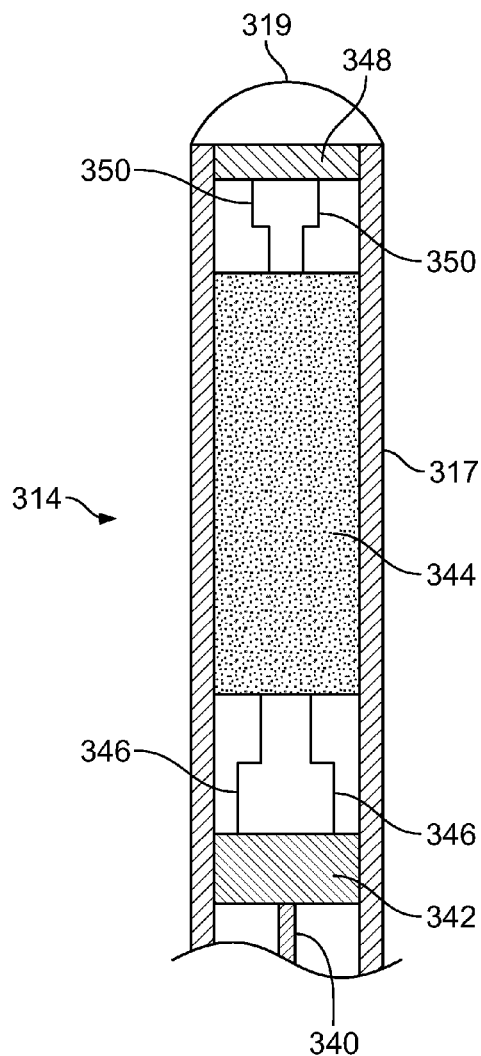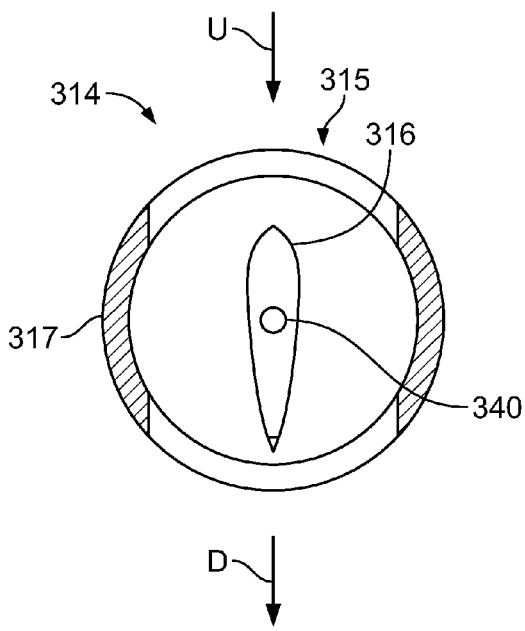
FIG. 8D
FIG. 8C

US 9,006,919 B2

ADAPTIVE HYDROKINETIC ENERGY HARVESTING SYSTEM

CROSS-REFERENCE TO RELATED APPLICATIONS

This application claims the benefit of U.S. Provisional Patent Application Ser. No. 61/450,270, filed Mar. 8, 2011, the disclosure of which is incorporated by reference herein in its entirety.

FIELD OF THE INVENTION

The present invention relates to a fluid energy harvesting system, and, more particularly, to a hydrokinetic energy harvesting system that is adaptive to changing hydrodynamic conditions to maximize energy harvesting efficiency.

BACKGROUND OF THE INVENTION

The economical generation of electrical power has long been an important humanitarian objective. More recently, the generation of electrical power in an environmentally-friendly manner has also become an important objective. Hydrokinetic generating systems have been provided to harvest renewable energy to meet these objectives. A hydrokinetic electrical generating system that is scalable in size and is adaptive to changing fluid flow conditions for maintaining and maximizing energy harvesting efficiencies is needed, but has yet to be provided.

SUMMARY OF THE INVENTION

In one aspect, the present invention provides an system for harvesting hydrokinetic energy from a flowing fluid which adapts to changes in the flow characteristics. In some embodiments of the present invention, the system includes a supporting structure that defines a flow-way therethrough, and at least one vane having a hydrofoil cross-section with a leading edge for facing into the direction of flow of a flowing fluid and a trailing edge opposite the leading edge. The vane is positioned within the flow-way and mounted to said supporting structure so that it oscillates as the fluid flows across it from the leading edge to the trailing edge, thereby generating torque. The vane is also attached to an energy conversion module that converts the torque to an electrical current. The energy conversion module includes an electrical power generator connected to the vane such that the oscillating vane drives the generator. The system also includes a control module that measures the oscillation of the vane, the generated torque, or the characteristics of the generated current, and modifies the resistance of the vane or the conversion of the electrical current accordingly.

In other embodiments of the present invention, the system includes an electrically-powered illumination device powered by a battery that is charged by the electrical power generator. Such a system may be housed in an elongated structure that may be anchored by one end in a flowing stream, and may also be used as a walking stick.

In some other embodiments of the present invention, the supporting structure is a tube, pipe or conduit. Such embodiments may be adapted for use as inline coupling devices.

In another aspect, the present invention provides a towable hydrokinetic harvesting system. In some embodiments of this aspect of the invention, the system may have two hydrofoil-type blades movably connected to each other at their respective ends. Components of an electrical power generating device are affixed to the adjacent ends of the blades such that they cooperate to generate electrical current as the blades move relative to each other. Such movement is caused by towing the system so that turbulent flow is generated along its surface. In some embodiments, the generator illuminates LEDs at the surfaces of the blades. In some of such embodiments, the system is adapted for use as a fishing lure.

BRIEF DESCRIPTION OF THE DRAWINGS

For a more complete understanding of the present invention, reference is made to the following detailed description of exemplary embodiments considered in conjunction with the accompanying drawings, in which:

FIG. 8A is a front elevational view of a portable hydrokinetic energy harvesting system constructed in accordance with a fourth exemplary embodiment of the present invention;

FIG. 8B is an enlarged view of a lower portion of the hydrokinetic energy harvesting system shown in FIG. 8A;

FIG. 8C is a schematic cut-away of an enlarged view of an upper portion of the hydrokinetic energy harvesting system shown in FIG. 8A, depicting internal components thereof;

FIG. 8D is a schematic cross-sectional view, taken along section line 8D-8D of FIG. 8B and looking in the direction of the arrows, of the hydrokinetic energy harvesting system shown in FIG. 8B;

DETAILED DESCRIPTION OF THE EXEMPLARY EMBODIMENTS

Although the present invention can be used in conjunction with many types of fluid, such as water, fuel, oil, industrial effluent, air, gas, etc., it is particularly suitable for use in connection with hydrodynamic fluid flow. Accordingly, the present invention will be described hereinafter in connection with hydrodynamic fluid flow. It should be understood, however, that the following description is only meant to be illustrative of the present invention and is not meant to limit the scope of the present invention, which has applicability to other fluids.

Figure 1:
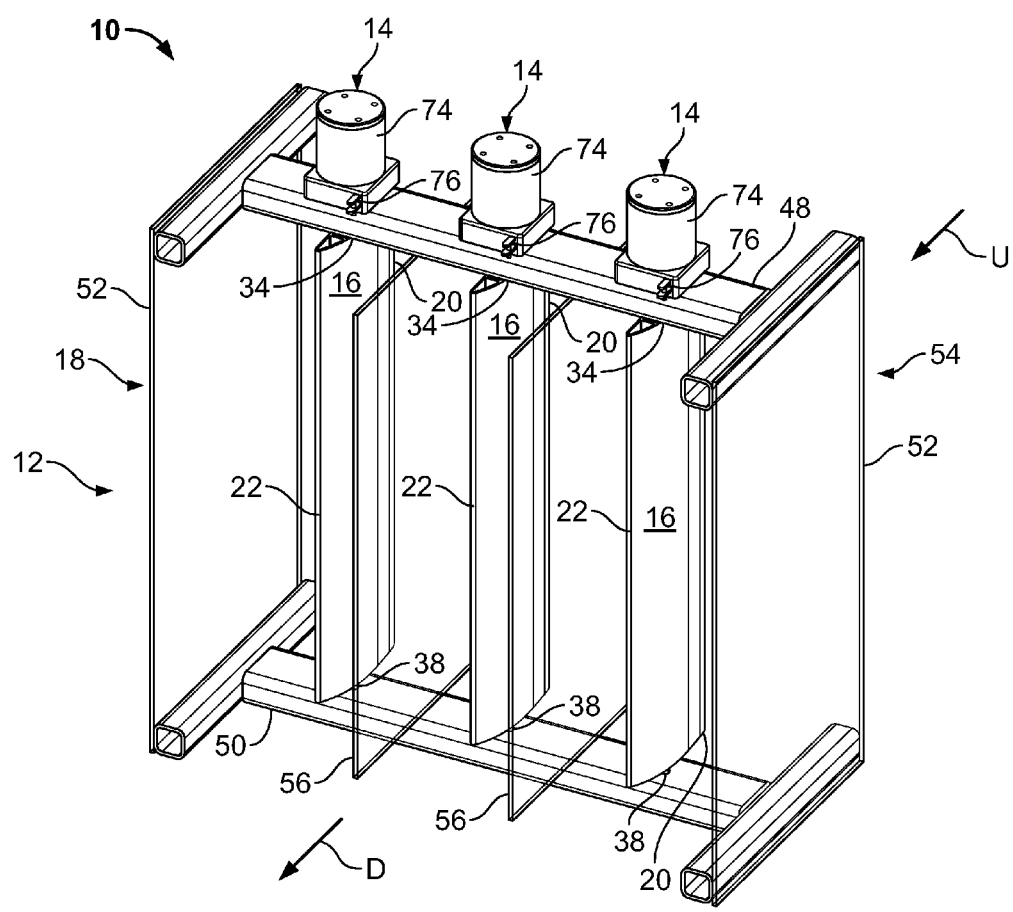
FIG. 1 is a front perspective view of an adaptive hydrokinetic energy harvesting system constructed in accordance with an exemplary embodiment of the present invention and including a plurality of vanes, each of which is connected to a corresponding energy conversion and control unit.

FIG. 1 illustrates an adaptive hydrokinetic energy harvesting system (hereinafter "the system 10") that features an energy extraction unit 12 which is interconnected with one or more energy conversion and control units 14 through vanes 16 having hydrofoil contours. The energy extraction unit 12 extracts hydrokinetic energy from fluid flowing through it. The energy conversion and control unit 14 maximizes the functional efficiency of the energy extraction unit 12, and converts the extracted hydrokinetic energy into electrical energy. The energy extraction unit 12 is described hereinbelow, followed by a description of the energy conversion and control unit 14.

Figure 2A:
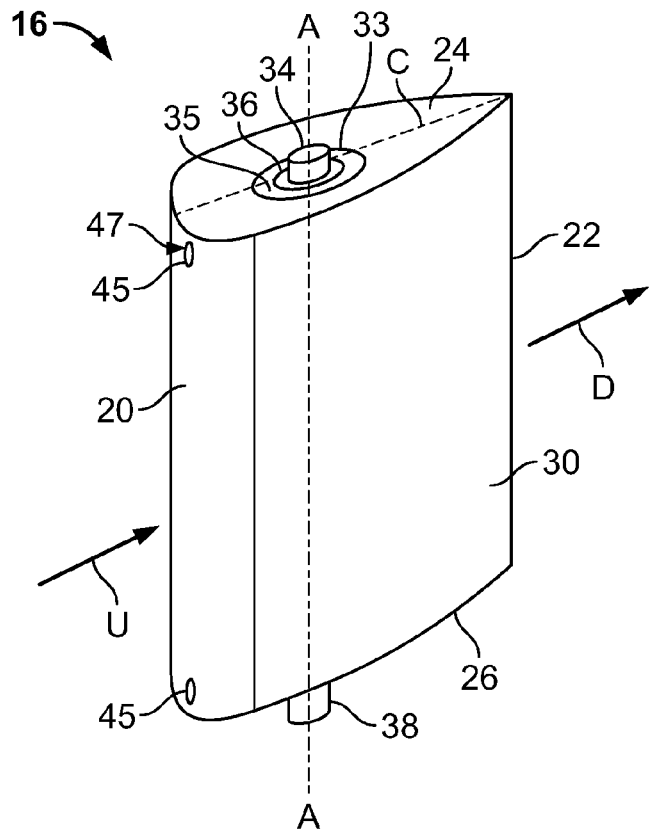
FIG. 2A is a front perspective view of one of the vanes shown in FIG. 1.
Figure 2B:
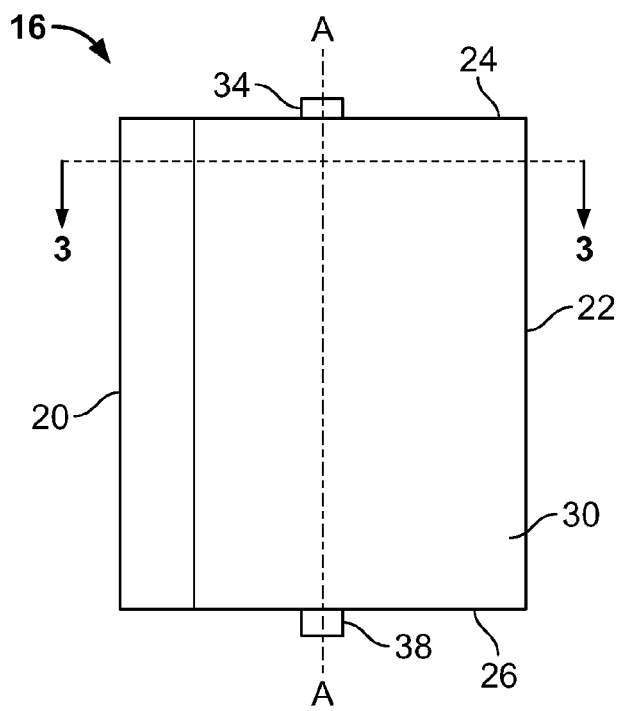
FIG. 2B is a side elevational view of the vane shown in FIG. 2A.
Figure 3:
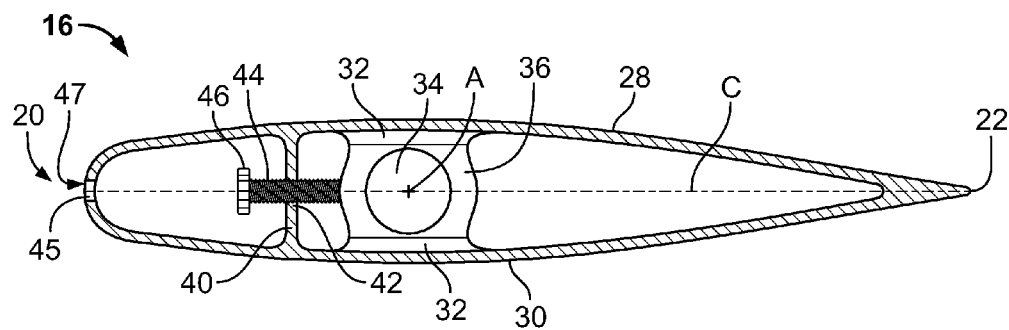
FIG. 3 is a cross-sectional view of the vane shown in FIG. 2B, taken along section line 3-3 of FIG. 3B looking in the direction of the arrows.

Referring to FIGS. 1-3, the energy extraction unit 12 has a plurality of vanes 16 in a support structure 18. Each vane 16 is constructed with a fluid-tight interior so that its moment of inertia remains unchanged when its immersed in a fluid. Each vane 16 has leading and trailing edges 20, 22, respectively, that are substantially parallel to its longitudinal axis A, and upper and lower surfaces 24, 26, respectively, that are substantially parallel to each other.

The hydrodynamic shape of the cross-section of an exemplary vane 16 is shown in FIG. 3. First and second curved surfaces 28, 30 are opposite each other and extend from the upper surface 24 to the lower surface 26, and from the leading edge 20 to the trailing edge 22. It is understood that when the vanes 16 are immersed in flowing fluid, changes of fluid pressure near the curved surfaces 28, 30 create lift force vectors (not shown) which are oriented normal to the curved surfaces 28, 30. In cases of unsteady-state or turbulent flow in the fluid layer adjacent the curved surfaces 28, 30 (i.e., "the boundary layer"), the resulting lift forces acting on the curved surfaces 28, 30 will vary in strength over time. The variation in the lift force vectors produces a varying moment of force (i.e., oscillating torque) that acts on the vanes 16 about the longitudinal axis of the vane, causing the vane 16 to flutter about it longitudinal axis A.

Since the hydrofoil contours of the curved surfaces 28, 30 vary depending in the particular application of the system 10, and since numerous alternative vanes are described hereinbelow, it is appropriate to define and use the term "camber." Camber is a geometric aspect of an hydrofoil contour. More particularly, camber is a measurement of the asymmetry between the first and second surfaces 28, 30 of the vane 16 and may be depicted by a camber line C (see, e.g., FIGS. 2A, 3, and 3A-3I). The camber line C of the vane 16 is a line that is positioned halfway between the first and second surfaces 28, 30. The camber line C of FIG. 3 might be curved if the opposite hydrofoil surfaces were asymmetrical such as in FIG. 3H. However, because the first and second surfaces 28, 30 of the vane 16 are symmetrical, the camber line C of the vane 16 is a straight line.

Referring to FIGS. 1, 2A, 2B and 3, the vane 16 is fabricated with a matching set of upper and lower internal elements (i.e., proximate the upper and lower-surfaces 24, 26, respectively, of FIG. 2A) which are described hereinafter. Lower internal elements generally function in the same manner as the upper internal elements and are sized and shaped accordingly. Therefore, for clarity, only the upper internal elements proximate upper surface 24 are depicted and described with respect to FIG. 3 and subsequent FIGS. 3A-3I, with the understanding that a similar arrangement of elements is present proximate lower surface 26.

Continuing to refer to FIGS. 1, 2A, 2B and 3, the vane 16 has slide mounts 32 (see FIG. 3) that are fixedly fastened to the interior of the vane 16. An upper pivot pin 34 is fastened to an upper collar 36, and extends upwardly through an opening 33 in the upper surface 24 of the vane 16. The upper pivot pin 34 pivotally connects the upper portion of the vane 16 to the energy conversion and control unit 14 (see FIG. 1) in the manner described below. The upper collar 36 is slidably mounted in the upper slide mount 32 and is able to slide within the upper slide mount 32, in a direction along the camber line C, towards or away from the leading edge 20 of the vane 16 (see FIG. 3), for purposes that are described hereinbelow. Since the upper pivot pin 34 is fastened to the upper collar 36, the upper pivot pin 34 is therefore able to slide with the upper collar 36 in the upper slide mount 32. The upper pivot pin 34 is therefore also moveable within the opening 33 in the upper surface 24. A flexible upper seal 35 (e.g., a rubber boot or bladder) is provided between the collar 36 and the edge of the opening 33. The upper seal 35 accommodates movement of upper pivot pin 34 within the opening 33 of the upper surface 24 while maintaining fluid-tight seal in the upper surface 24. A lower pivot pin 38 has a lower collar (not visible) fastened to it. The lower pivot pin 38 extends downwardly from the lower surface 26 of the vane 16. A lower seal (not visible), which is similar to the upper seal 35, is provided in the lower surface 26 to maintain a fluid-tight seal therein.

Referring to FIG. 3, a web member 40 is oriented transversely to the camber line C in the interior of the vane 16, proximate the slide mount 32. The web member 40 has a threaded bore 42 which has an axis oriented in a direction that is coincident with the direction of the camber line C. An adjustment screw 44 with cogged-wheel head 46 is installed in the bore 42 of the web member 40. The adjustment screw 44 is rotatably attached to the collar 36 of the upper pivot pins 34 for purposes that are described hereinbelow. Plug 45 is removably positioned in hole 47 in the leading edge 20 of the vane 16. The plug 45 is sized and shaped so that, when the plug 45 is installed in the hole 47 in the leading edge 20 of the vane 16, it seals the hole 47 in a fluid-tight manner so that the interior of the vane 16 remains fluid-tight under the pressure-head at which the vane 16 is employed. The hole 47 is aligned with the threaded bore 42 of the web member 40. When the plug 45 is removed from the hole 47, access is provided for a user to manipulate the adjustment screw 44, as described hereinbelow.

Now referring to FIG. 1, the support structure 18 of the energy extraction unit 12 has upper and lower frames 48, 50, respectively, for supporting the vanes 16 within the energy extraction unit 12. A pair of opposed sidewalls 52 are positioned between the upper and lower frames 48, 50 and are oriented substantially parallel to the longitudinal axes A of the vanes 16, and substantially perpendicular to the upper and lower frames 48, 50. The upper and lower frames 48, 50 and the sidewalls 52 form a flow-way 54 through which fluid flows through the energy extraction unit 12. The support structure 18 and the vanes 16 of the energy extraction unit 12 may be fabricated from material suitable for use in the type of fluid in which they are immersed and under the pressure-head at which they are employed. For example, if the system is deployed in salt water, non-corrosive materials, such as stainless steel or plastic, may be used. The vanes 16 may be fabricated by extrusion or another process suitable for fabricating hollow, fluid-tight structures.

The upper pivot pin 34 of the vane 16 is pivotally installed in an upper bearing (not shown) that is anchored in the upper frame 48, and the lower pivot pin 38 is installed in a lower bearing (not shown) that is anchored in the lower frame 50 of the support structure 18. The upper bearing is fabricated with a seal, which may be of a conventional type, that permits low-friction oscillating rotational motion of the upper pivot pin 34 therein while maintaining a fluid-tight seal so that the interior of the vane 16 remains fluid-tight under the pressure-head at which the system 10 operates. The upper pivot pin 34 is fixedly attached to an electromagnetic device (not shown) which is associated with an energy conversion and control unit 14 in a manner to be discussed further hereinbelow. For instance, in some embodiments of the present invention, the upper pivot pin 34 may be fixedly attached to the rotor of a conventional electromagnetic generator (not shown). As the vane 16 flutters, the upper pivot pin 34 may rotate a rotor within a stator of the generator, thereby generating electromagnetic force (emf). In other embodiments of the present invention, a piezoelectric generator may be used. Such a piezoelectric generator may have a piezoelectric element and a mechanical means for inducing stress or strain in the piezoelectric element, that cooperate with the upper pivot pin 34.

Continuing to refer to FIG. 1, along with FIG. 3, the arrow U indicates the direction of the fluid that flows towards the flow-way 54 and the leading edges 20 of the vanes 16. The arrow D indicates the direction of the fluid that flows away from the flow-way 54 and the trailing edges 22 of the vanes 16. Fluid flowing through the flow-way 54 generates turbulent fluid flow on the first and second surfaces 28, 30 of the vane 16. In some embodiments of the system 10, the sidewalls 52 may be oriented at angles, relative to the direction indicated by the arrow U, in order to augment the generation of turbulent flow through the flow-way 54. In other embodiments of the system 10, each of the sidewalls 52 may be curved towards the vanes 16 in order to restrict the flow of fluid flowing through the flow-way 54 and accelerate the velocity of the fluid to augment the generation of turbulent flow. As described hereinabove, the turbulent flow induces flutter or an oscillating rotational motion of the vane 16 about its longitudinal axis A. Guide panels 56 may be positioned between the vanes 16 and attached to the upper and lower frames 48, 50 of the support structure 18. The guide panels 56 may be angled, relative to the direction of the fluid flow in the flow-way 54, to optimize the channelization of the fluid flowing through the flow-way 54. The guide panels 56 may also be arranged to increase the turbulence of the fluid flowing through the flow-way 54 and/or to equalize the volumes of the fluid that flow past each of the vanes 16.

Referring to FIG. 3, the hydrodynamically shaped cross-sectional contour of the vane 16 has a constant shape extending from the upper surface 24 to the lower surface 26. The vane 16 has a wide, symmetrical cross-sectional shape with the longitudinal axis A positioned forward along the camber line C, towards the leading edge 20 of the vane 16. The positioning of the longitudinal axis A of the vane 16 along the camber line C is useful in establishing the optimum oscillatory performance of the vane 16. Manual and automatic methods for moving the position of the longitudinal axis A along the camber line C are described hereinbelow.

Figure 3A:
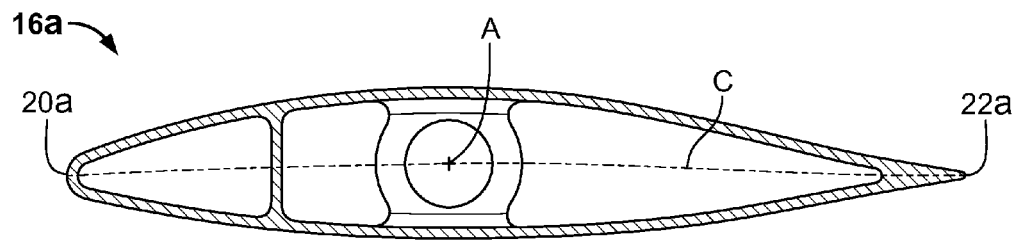
FIGS. 3A-3I are cross-sectional views of additional exemplary vanes which depict their hydrofoil contours.

Referring now to FIGS. 3A-3J, a variety of differently-shaped vanes 16a through 16j are shown. Vanes 16a through 16j are adapted to provide various fluid flow characteristics. With reference to FIG. 3A, a vane 16a is shown which has a symmetrical cross-sectional profile, and a more centrally located longitudinal axis A. The vane 16a may require a flow disturber, which may be an object such as a wedge (not shown) positioned in the upstream flow U, to prevent the vane 16a from stalling. A typical flow disturber is described hereinbelow in connection with the description of FIG. 12.

Figure 3B:
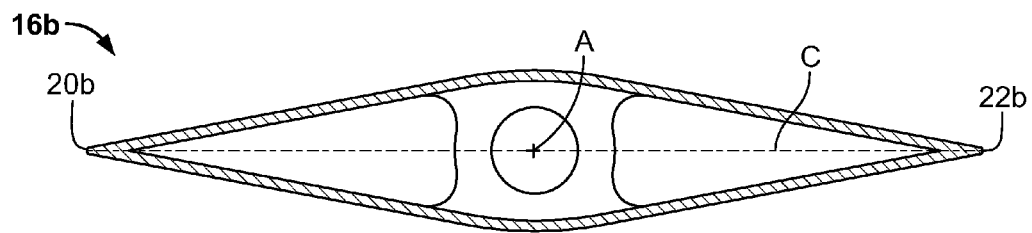

Referring to FIG. 3B, a vane 16b has a symmetrical cross-sectional profile, with harsher, more distinct curvature than the curvature of the vanes 16, 16a of FIGS. 3 and 3A. The sharp leading and trailing edges 20b, 22b, respectively, are typically found in supersonic airfoils, but can also be utilized in the system 10 in connection with supersonic flows of fluid for increased oscillatory motion of the vane 16b. The position of the longitudinal axis A can be moved closer to the leading edge 20b of the vane 16b than is shown in FIG. 3B to avoid spinning the vane 16b.

Figure 3C:
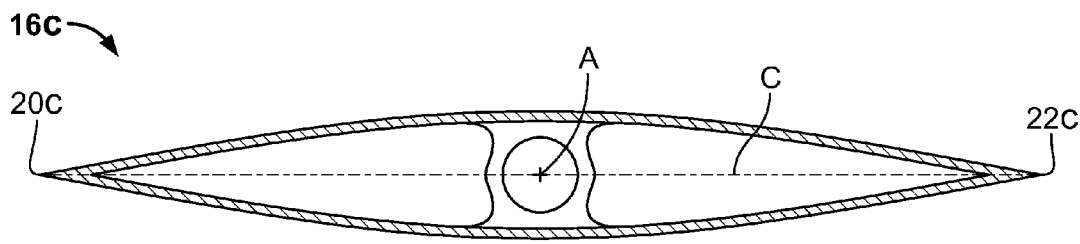

FIG. 3C illustrates a vane 16c which has a similar cross-sectional profile to the symmetrical vane 16b. The vane 16c has softer angles, but it is still applicable for supersonic applications. The longitudinal axis A may be positioned further forward towards the leading edge 20c than is shown in FIG. 3C to avoid spinning the vane 16c.

Figure 3D:
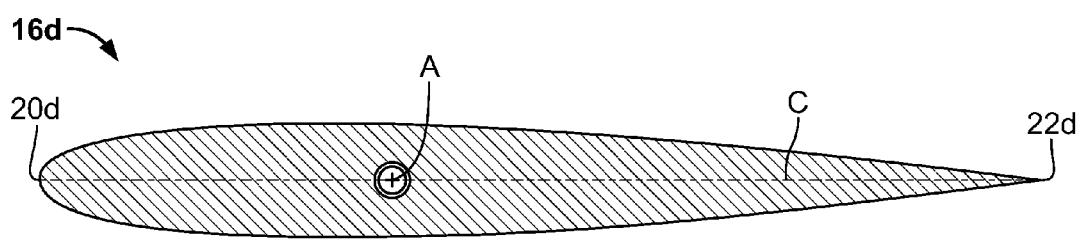

FIG. 3D illustrates a vane 16d which has a nearly symmetrical cross-sectional profile, with a slight camber at the trailing edge 22d. The shape of the vane 16d has a combination of symmetrical and cambered shapes to reduce the possibility of stalling.

Figure 3E:
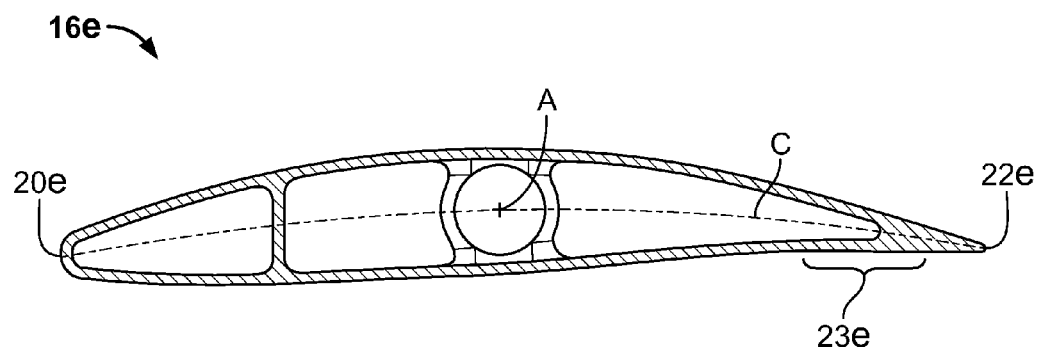

Referring to FIG. 3E, vane 16e has a shallow camber line, following an asymmetrical cross-sectional profile. The trailing edge 22e is slightly angled relative to the camber line C through portion 23e, which can aid the generation of the oscillatory motion of the vane 16e at higher flow rates.

Figure 3F:
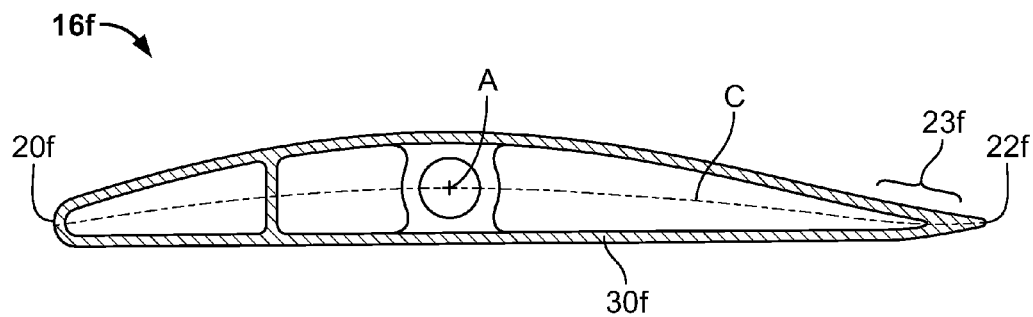

FIG. 3F illustrates a vane 16f which has a cross-sectional profile that is similar to that of the vane 16e, but has a flat second surface 30f, to prevent stalling. The trailing edge 22f has a slight angle relative to the camber line C through portion 23f which should aid in the production of oscillations.

Figure 3G:
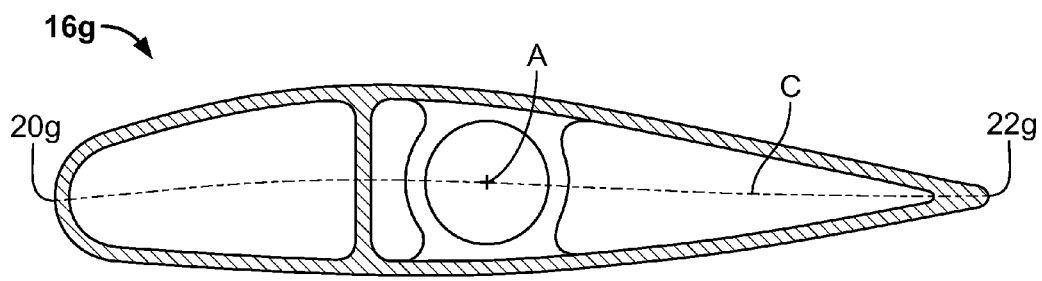

Referring to FIG. 3G, vane 16g has an asymmetrical cross-sectional profile, with a near-centrally located longitudinal axis A. The large blunt leading edge 20g enhances the generation of turbulent flow.

Figure 3H:
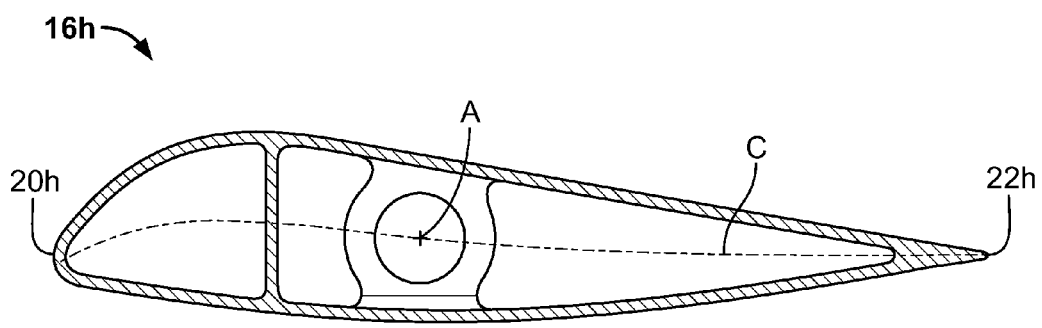

FIG. 3H illustrates a vane 16h which has a reverse-camber (i.e., a reflexed camber line C). This cross-sectional profile can be used in conjunction with a positive-cambered vane (not shown), to aid in generating turbulence between neighboring vanes.

Figure 3I:
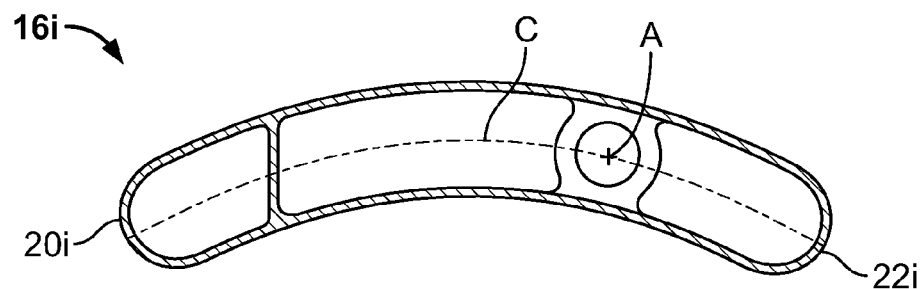

Referring to FIG. 3I, a vane 16i has a heavily-reflexed cross-sectional shape, with a severe camber line C. This shape enhances the generation of an additional pitching moment about the longitudinal axis A of the vane 16i, which can aid in generating additional oscillations.

Figure 3J:
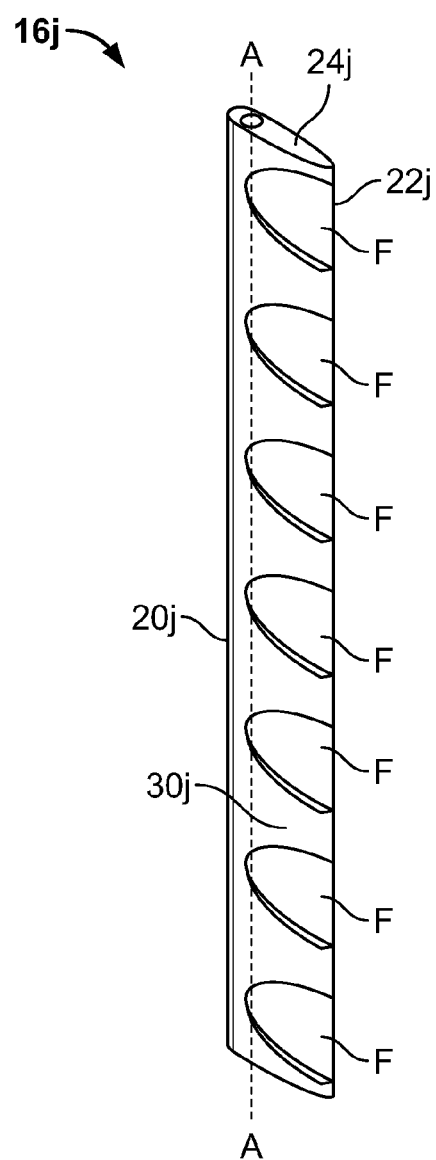
FIG. 3J is a perspective view of an exemplary vane which has external fillet-contours formed on its external surface.

FIG. 3J illustrates a vane 16j which has a plurality of fillets F formed on its first and second curved surfaces, of which only second curved surface 30j is visible. The fillets F enhance the generation of turbulent flow.

Figure 4:
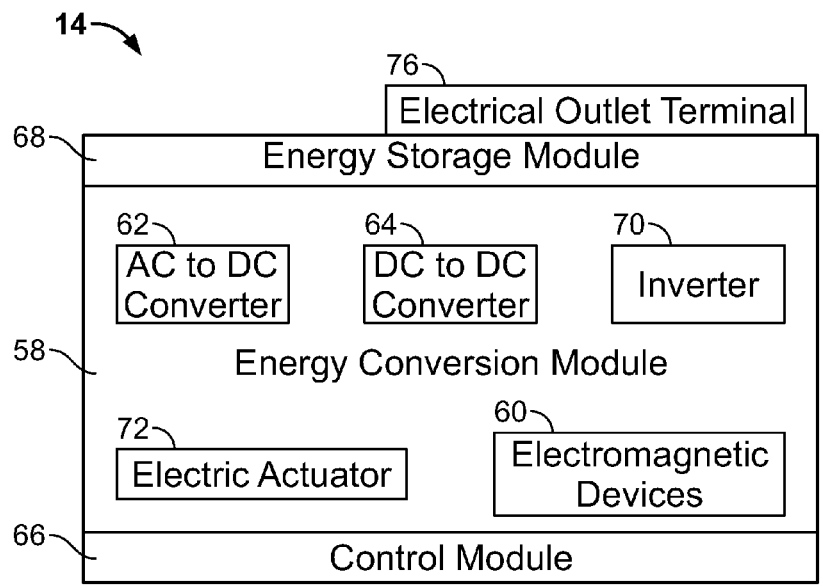
FIG. 4 is a block diagram identifying components of one of the energy conversion and control units that is shown in FIG. 1.

Referring now to FIG. 4, the energy conversion and control unit 14 converts the oscillating motion, or flutter, of vane 16 into an electrical current. This is accomplished by an energy conversion module 58 of the energy conversion and control unit 14. The energy conversion module 58 may utilize an electromagnetic device 60 such as a generator (not shown) attached to the upper pin 34 of the vane 16 (see FIG. 2A) to produce the AC electrical current, which may then be converted to direct current (DC) by an AC-DC converter 62. In some embodiments, the generator may include a piezoelectric device, rather than an electromagnetic device. The energy conversion module 58 may feed DC current to a DC-DC converter 64, for purposes such as those described hereinbelow.

Figure 5:
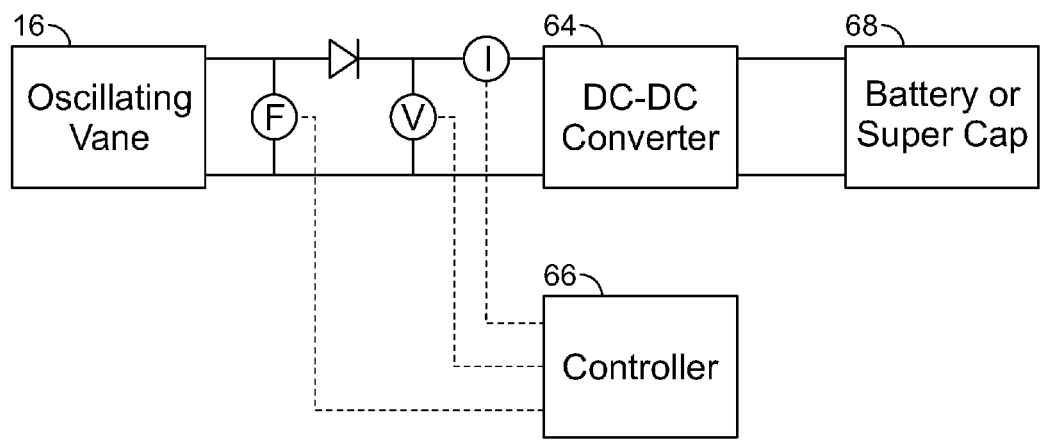
FIG. 5 is a circuit diagram showing the interconnection of some of the components of the energy conversion and control unit shown in FIG. 4.

The energy conversion and control unit 14 includes a control module 66, which has electronic circuitry (e.g., the circuitry illustrated in FIG. 5) that receives signals provided by sensors (not shown), such as rotary encoders, position sensors, and accelerometers. The signals indicate, for example, the frequency, voltage and current developed by the energy conversion module 58, or the oscillation frequency or torque of the vane 16. Arrangements of sensors suitable for use with the system 10 will be readily recognized by those having ordinary skill in the relevant arts.

As discussed hereinbelow, the energy conversion and control unit 14, through the interactive cooperation of its various components, sensors and programmable algorithms, can generate electrical energy output from the system 10 in response to changing flow conditions. In operation, the control module 66 may control the voltage output of the DC-DC converter 64 to levels required for some desired end use, or control the resistive load on the oscillating vane 16 to extract the maximum power from the flowing fluid. The control module 66 may also adjust the DC-DC converter 64 to provide maximum power tracking. More particularly, the control module 66 may monitor the power delivered for the end use and adjust the output current so as to maximize power generation. As the speed of the water flowing past the vane 16 increases (see FIG. 1), the oscillation frequency and the torque generated by the vane 16 also increases. As this occurs, the control module 66 may detect such changes and increase the current to the end use output load so as to present a greater load on the vane 16. By seeking the maximum power output in real time, an optimum quantity of energy is harvested from the vane 16. It is understood that the system 10 may be constructed with the longitudinal axes A of the vanes 16 being fixed in their positions along their camber lines C (see, e.g., FIG. 3). The electrical output of the energy conversion module 58 may also be stored in an energy storage module 68, such as a battery or super capacitor, or other device having the capacity to store and release electrical potential, for use at a time following the generation of the electromagnetic force (emf).

The control module 66 can also provide additional functionality besides controlling voltage output. When the vane 16 is not moving because of very low fluid flow, the control module 66 can reduce the resistive load on the vane 16 to near zero in order to encourage the vane 16 to move. It is also possible for the control module 66 to direct power to the vane 16 for a short time in order to start the vane 16 moving. To do this, power from the energy storage module 68 can be routed to the electromagnetic device 60 of the energy conversion module 58, which can then act as a motor instead of a generator. After a short time, the control module 66 can switch the electromagnetic device 60 back to generator mode. The control module 66 can also prevent vane 16 from stalling. For instance, if the vane 16 oscillates too fast, it may go into a stall condition. The control module 66 can prevent this by increasing the resistive load on the vane 16 when an imminent stall is detected, and thus slow down the oscillations of the vane 16 to avoid the stall.

In an embodiment of the present invention, rather than using the DC-DC converter 64 to provide energy to the energy storage module 68, the converter 62 may be connected to a current inverter 70. The inverter 70 can supply AC power which can either be used in a stand-alone mode or tied to the utility grid. The inverter 70 can incorporate the same features as the DC-DC converter 64 to provide maximum power tracking, idle power startup and stall prevention.

In an embodiment of the present invention, the energy conversion and control unit 14 may have an electric actuator 72 (see FIG. 4), such as a stepper-motor, that may automatically adjust the adjustment screws 44 to of the vane 16 to optimally position the longitudinal axes A along the camber line C of the vane 16 for automatically maintaining maximum power tracking. This can be accomplished, for example, by linking the electric actuator 72 to the cogged-wheel heads 46 of the adjustment screws 44 of the vane 16 of FIG. 3. This may be accomplished by the use of a chain (not shown), which is sized and shaped so that links of the chain engage cogs of the cogged-wheel heads 46, whereby rotational motion of the electric actuator 72 rotates the cogged-wheel heads 46 of the adjustment screws 44 in the manner described hereinbelow. The electric actuator 72 is controlled by the control module 66 of the energy conversion and control unit 14. In order to optimally position the longitudinal axes A along the camber line C of the vane 16, the control module 66 may process signals received from sensors installed on the energy extraction unit 12 of FIG. 1 (sensors not shown), such as signals communicating data about the frequency and torque produced by the vanes 16. It is understood that algorithms for facilitating maximum power tracking in systems such as the system 10 of FIG. 1 are well known in the art, as are hardware and data storage media for their implementation.

Referring back to FIG. 1, the energy conversion and control unit 14 is contained in a fluid-tight housing 74 that prevents fluid intrusion into the energy conversion and control unit 14. More particularly, seals (not shown) are positioned on the upper pivot pins 34 to prevent fluid intrusion into the housings 74 of the energy conversion and control units 14. The housing 74 and associated seals are fabricated from materials which are suitable for use in the fluids and under the pressures that they may be immersed. For example, if the system is deployed in salt water, non-corrosive materials such as stainless steel and/or plastic may be utilized.

In operation, the system 10 may be deployed in flowing fluids (e.g., fluids in channels, streams, rivers, etc.) by anchoring the lower frame 50 and connecting the output terminals 76 to loads such as domestic or campsite appliances, field equipment for scientific or engineering purposes, or to a commercial electric power grid. Alternately, the system 10 may be attached to anchored buoys with the energy extraction unit 12 positioned so that it is fully immersed below the surface of the water. At the time of deployment, the system 10 may be manually tuned by adjusting the adjustment screws 44 (see FIG. 3) to position the longitudinal axis A of the vanes 16 in an optimal orientation for maximum energy extraction under the prevailing fluid flow conditions. This will optimize the oscillatory motion of the vane 16 about the longitudinal axis A for the particular flow rate, viscosity and or other characteristics of the fluid flowing through the system 10. This may be accomplished by removing the plugs P from the hole 47 (see FIG. 3) in the leading edge 20 of the vane 16, and alternately inserting a screwdriver onto upper and lower cogged-wheeled heads of the upper and lower adjustment screws 44, and then screwing the adjustment screws 44 in order to adjust the position of the longitudinal axis A of each of the vanes 16 by adjusting the location of the upper and lower pins 34, 38 within the vane 16. The guide panels 56 (see FIG. 1) may also be adjusted to maximize the turbulence of the fluid flowing through the flow-way 54, thereby also optimizing the oscillatory rotational motion of the vanes 16 and maximizing the energy harvesting efficiency of the system 10.

Automatic and continuous adjustments of the adjustment screws 44 (see FIG. 3), for the purpose of optimizing of the position of the longitudinal axis A along the camber line C, may be accomplished by the electric actuator 72 of the energy conversion module 58 (see FIG. 4) operating under the direction of the control module 66. As described hereinabove, the control module 66 receives and processes signals from sensors that provide measurements of operating parameters, such as, for example, the frequency, torque, and amplitude of the oscillations of the vanes 16, or the frequency, voltage and current developed by the energy conversion module 14. Alternately, if the fluid flow operating parameters vary dynamically over time, the user may activate the automatic adaptive functioning of control module 66 (e.g., via conventional wired or wireless interfaces to the processors of the control modules 66). During operation in the automatic adaptive functioning mode of the control modules 66, the control modules 66 may automatically facilitate maximum power tracking as well as idle power startup and stall prevention of the energy extraction unit 12, in the manner described hereinabove.

FIG. 6, FIG. 7, FIGS. 8A-8D, and FIGS. 9A-9B, depict second, third, fourth, and fifth embodiments, respectively, of the present invention. Elements illustrated in FIG. 6, FIG. 7, FIGS. 8A-8D, and FIGS. 9A-9B, which correspond, either identically or substantially, to the elements described above with respect to the embodiment of FIGS. 1-3 have been designated by corresponding reference numerals increased by one hundred, two hundred, three hundred, and four hundred respectively. Unless otherwise stated, the embodiments of FIG. 6, FIG. 7, FIGS. 8A-8D, and FIGS. 9A-9B are constructed and assembled in the same basic manner as the embodiment of FIGS. 1-3.

Figure 6:
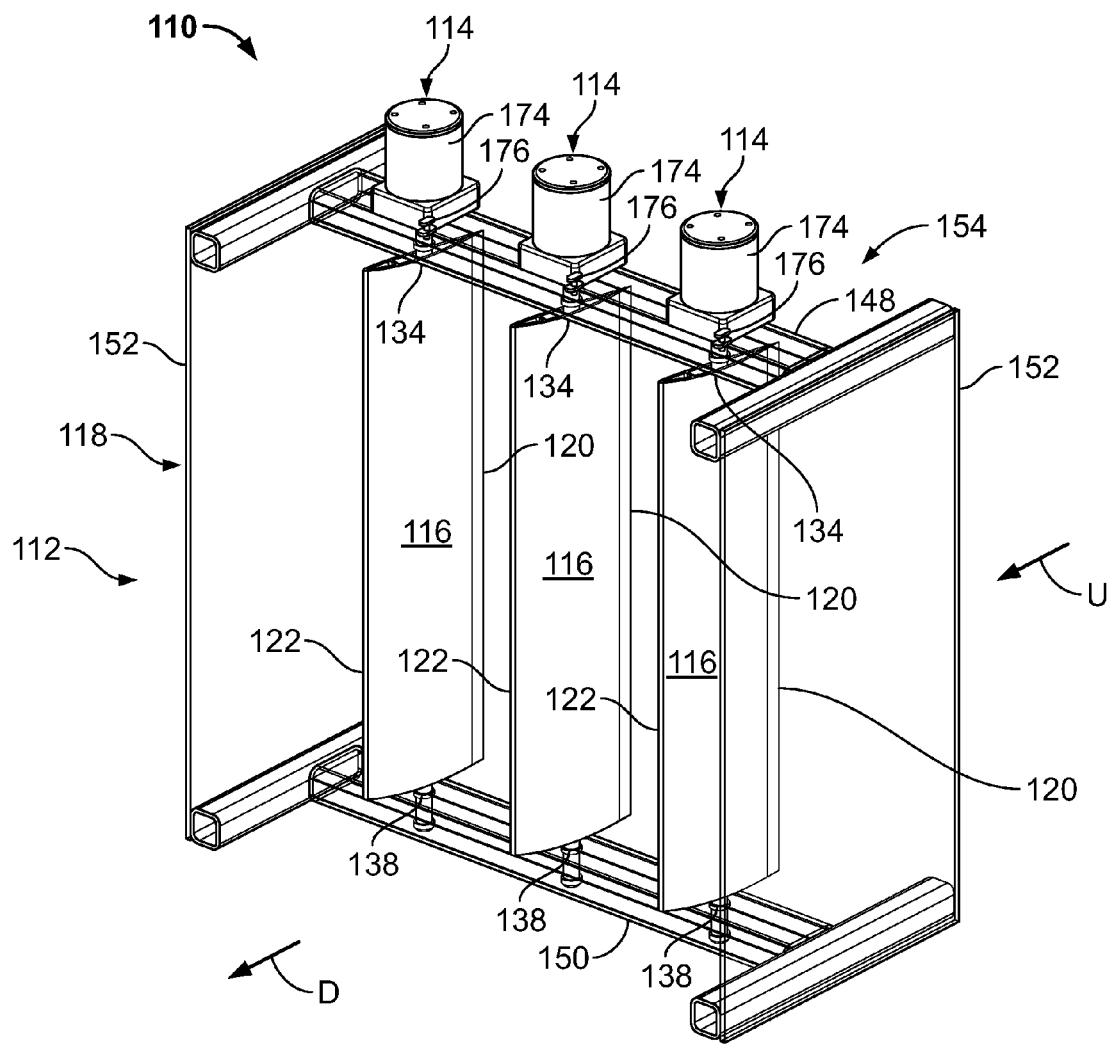
FIG. 6 is a front perspective view of an adaptive hydrokinetic energy harvesting system constructed in accordance with a second exemplary embodiment of the present invention.

FIG. 6 illustrates an adaptive hydrokinetic energy harvesting system 110 including an energy extraction unit 112, with vanes 116 that are interconnected with energy conversion and control units 114. The system 110 is similar to the system 10 of FIG. 1, except the energy extraction unit 112 is constructed without the use of guide panels, such as the guide panels 56 of the system 10. In operation, the absence of guide panels may lessen the balance of energy extraction among the vanes 116 of the systems 110.

Figure 7:
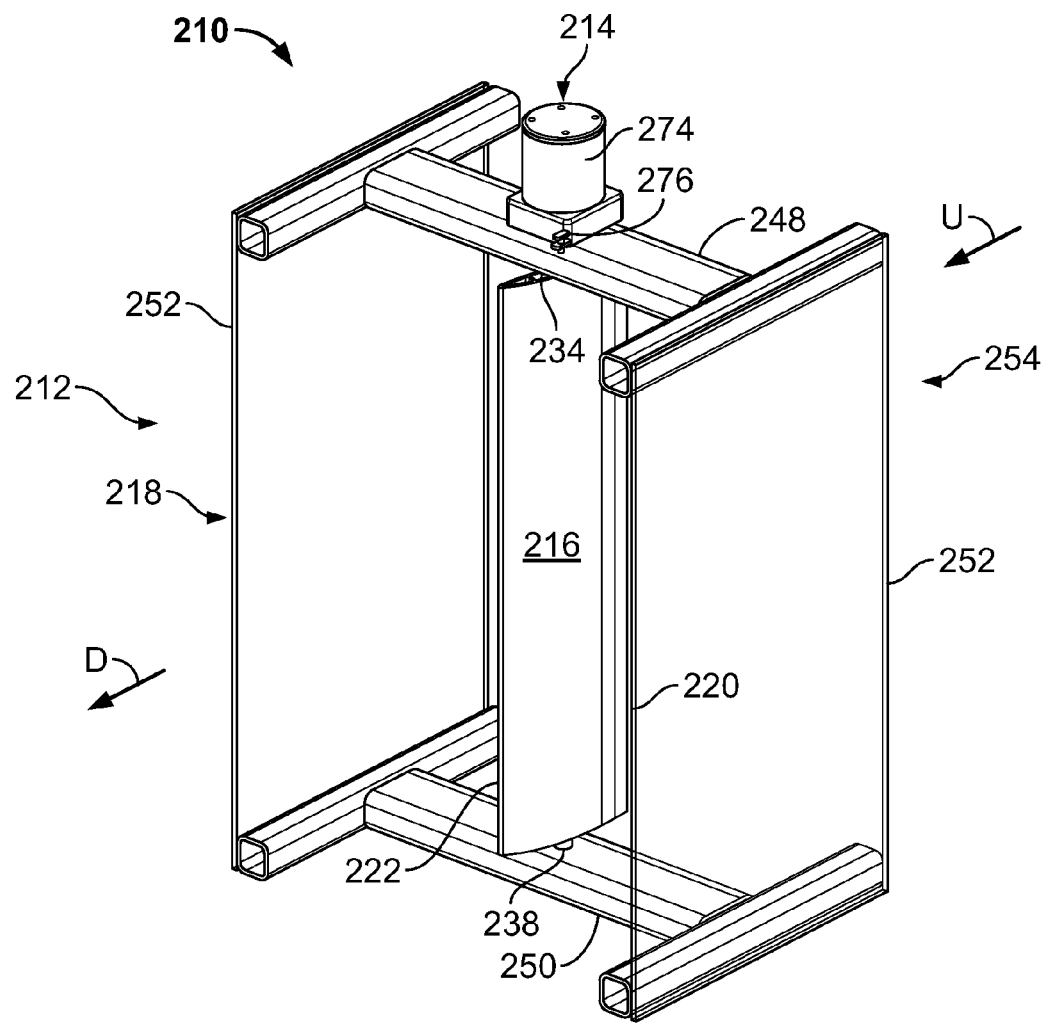
FIG. 7 is a front perspective view of an adaptive hydrokinetic energy harvesting system constructed in accordance with a third exemplary embodiment of the present invention.

FIG. 7 illustrates an adaptive hydrokinetic energy harvesting system 210 including an energy extraction unit 212, with a vane 216 that is interconnected with an energy conversion and control unit 214. The system 210 is similar to the system 110 of FIG. 6, except that the energy extraction unit 212 is constructed with one vane 216.

In operation, the system 210 may be deployed in a narrower fluid flow channel, stream or river than systems 10, 110, by anchoring the lower frame 250 of the energy extraction unit 212 and connecting the output terminals 276 to loads, such as domestic or campsite appliances, scientific or engineering field equipment, or to a commercial electric power grid. Alternately, the system 210 may be attached to an anchored buoy with its energy extraction unit 212 immersed just below the surface of the water.

Referring to FIGS. 8A, 8B, 8C and 8D, a compact, portable hydrokinetic energy harvesting system 310 is illustrated which has an energy extraction unit 312 that is interconnected with an energy conversion unit 314. The energy extraction unit 312 has a flow-way 315 with a vane 316 positioned therein. The energy conversion unit 314 is mounted in a housing 317, which supports a light 319, such as an LED. A pointed base 321 extends from the housing 317 of the energy conversion unit 314, for purposes that are described hereinbelow. The vane 316 is pivotally supported by upper and lower pivot pins 334 and 338. The upper pivot pin is connected to a shaft 340. Referring to FIG. 8C, the shaft 340 is connected to a micro-generator 342. The output of the micro-generator 342 is wired to a storage battery 344 by wiring 346. The light 319 has a terminal 348 which is connected to the battery 344 by wires 350.

In operation, the system 310 may be used, as a rapid deployment charging station for backpackers and campers, as well as a walking stick. The base 321 may have a pointed shape suitable, for example, for sinking the base 321 into a river bed. In an exemplary application of the system 310, a back-packer may use the system 310 as a walking stick on a hike. At the end of the hike, the hiker may implant the base 321 of the system 310 into the bed of a flowing stream, perhaps adjacent to the edge of the stream. The hiker may then pitch a camping tent near the system 310. With the stream flowing through the flow-way 315 of the energy extraction unit 312, the vane 316 would oscillate or flutter, provided electrical power to the light 319, which would, in turn, provide illumination. In addition, the batteries 344 may be charged, so that the system 310 may be removed from the stream and brought into the tent, whereby the light 319 illuminate the interior of the tent. The system 310 may also be used to provide an illuminated navigation warning marker for boaters to avoid navigating onto sand bars, shoals, or other waterway hazards, by implanting the base 321 of the system 310 into the bottom of the affected shallow waters. The system 310 may also be attached to an anchored mooring buoy, to assist boaters in locating the mooring buoy at night.

Figure 9A:
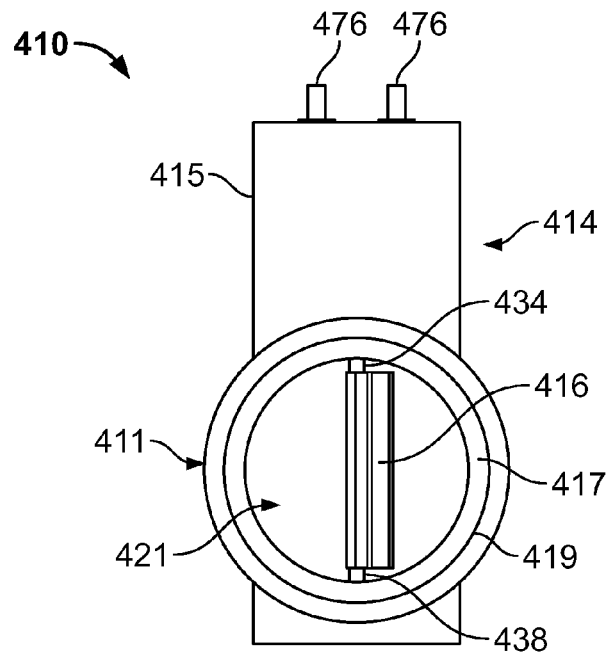
FIG. 9A is a front elevational view of a hydrokinetic energy harvesting system constructed in accordance with a fifth exemplary embodiment of the present invention.
Figure 9B:
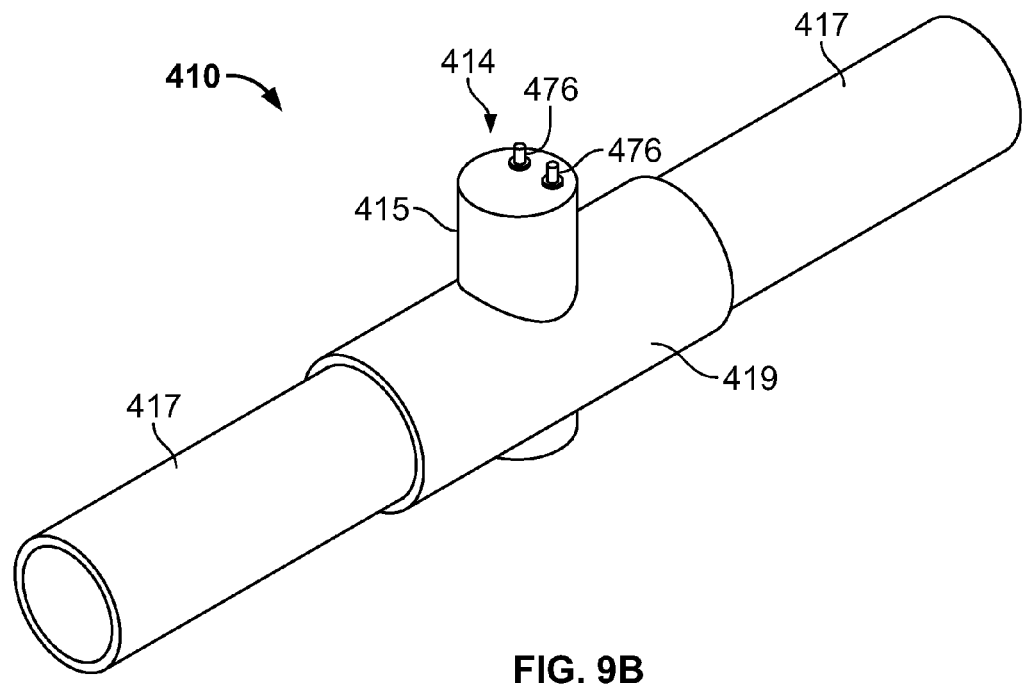
FIG. 9B is a top perspective view of the hydrokinetic energy harvesting system shown in FIG. 9A, the system being shown positioned in a pipe coupler.

FIGS. 9A and 9B depict a small scale hydrokinetic energy harvesting system 410 including an energy extraction unit 412, which is interconnected with an energy conversion unit 414. The energy conversion unit 414 is mounted in a tubular shaped housing 415. The energy extraction unit 412 has a cylindrical support structure 419 which forms a tubular shaped flow-way 421 with a vane 416 positioned therein. The support structure 419 is interconnectable with the fluid piping 417, and can be integrated into a pipe joint or coupler. Output terminals 476 extend outside the exterior of the housing 415 of the energy conversion unit 414, for connecting wires thereto. The embodiment of FIGS. 9A and 9B may be adapted for use with tubing, pipe or conduit.

In operation, the system 410 may be deployed for powering sensors located in remote locations. In some embodiments, the system 410 may be contained within a pipe coupler that can be quickly changed out to accommodate maintenance. In other embodiments, the system 410 may be placed in an open channel.

In a further embodiment of the present invention, FIGS. 10A-10E depict a small-scale hydrokinetic energy harvesting system 510. In the exemplary embodiment, the system 510 is in the form of a fishing lure, but other embodiments may be generalized from this exemplary embodiment. The system 510 has a body 512 that is pivotally attached to a tail 514, which functions according to the same hydrodynamic principles as the various vanes that have been discussed herein (e.g., vanes 16 and 16A-16J of FIGS. 3A-3J). A plurality of color-varying LEDs 516 are mounted on the tail 514, for purposes that are described hereinbelow. The body 512 has a towing eye 518 for attaching a line to the system 510. The system 510 has a water-proof micro-generator 520 positioned in the body 512 (see, e.g., FIG. 10D).

Figure 10A:
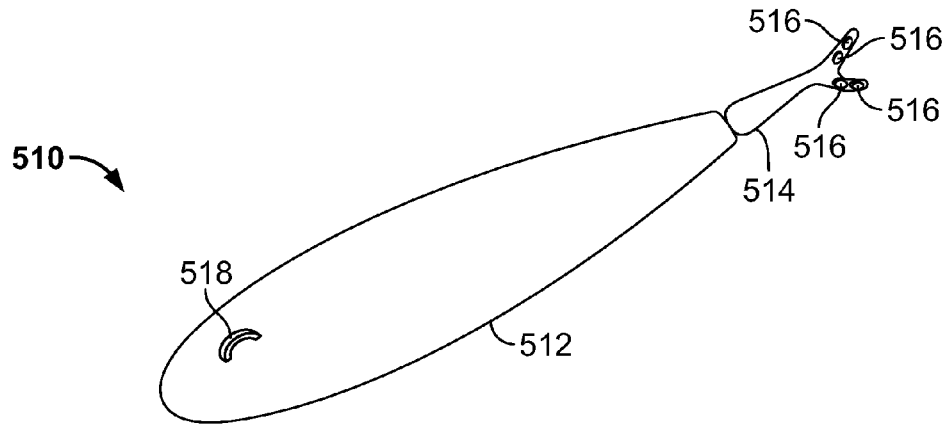
FIG. 10A is a top perspective view of a hydrokinetic energy harvesting system constructed in accordance with a sixth exemplary embodiment of the present invention.
Figure 10B:
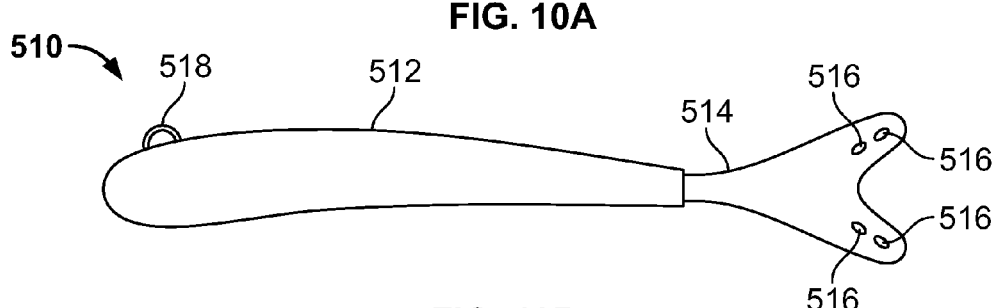
FIG. 10B is a side elevational view of the hydrokinetic energy harvesting system shown in FIG. 10A.
Figure 10C:
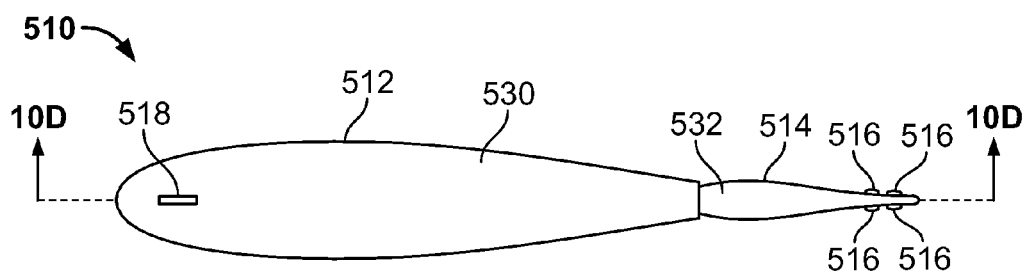
FIG. 10C is a top plan view of the hydrokinetic energy harvesting system shown in FIG. 10A.
Figure 10D:
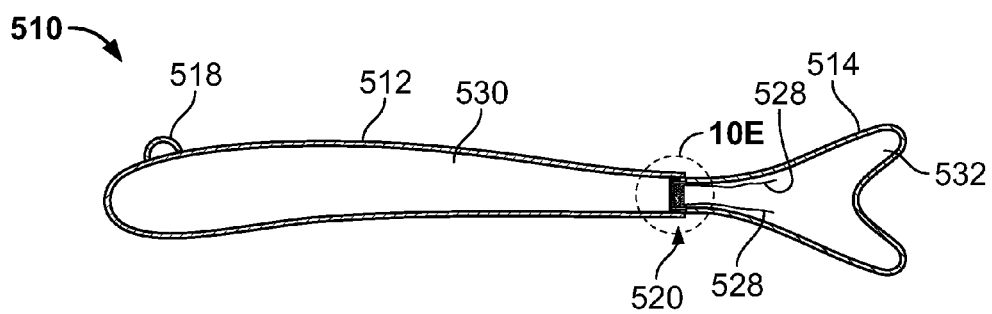
FIG. 10D is a cross-sectional view, taken along section line 10D-10D of FIG. 10C and looking in the direction of the arrows, of the hydrokinetic energy harvesting system shown in FIG. 10C.
Figure 10E:
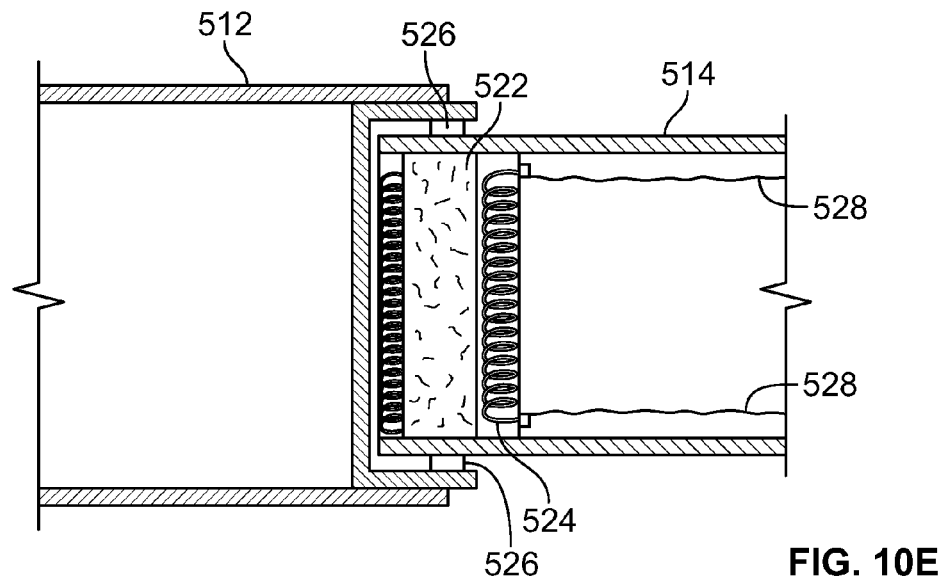
FIG. 10E is an enlarged view of a portion of the hydrokinetic energy harvesting system shown in FIG. 10D.

Referring to FIG. 10E, the micro-generator 520 has a stator 522 attached to the body 512, and rotor windings 524 that are attached to the tail 514. The rotor windings 524 are pivotally attached to the stator 522 by bearings 526. Wires 528 connect the output of the micro-generator 520 to the LEDs 516. When the tail 514 flutters, the rotor windings 524 oscillate in the stator 522. In other embodiments, the micro-generator 520 may be a piezoelectric element in one of the body 512 or tail 514, and a means for inducing strain or stress in other of the body 512 or tail 514.

The body and tail 512, 514 are fabricated with fluid tight hollow portions 530, 532, respectively, formed therein. Depending on size of the hollow portions 530, 532, the system 510 becomes either positively, neutrally or negatively buoyant when it is immersed in a fluid. In an embodiment of the present invention, the hollow areas 530, 532 are positioned so that the center of buoyancy is positioned directly above the center of gravity of the system 510 so that the system 510 floats in a level orientation, thereby preventing the system 510 from spinning when it is towed in the fluid in the manner described below. The body 512 and tail 514 may be made of polymer, formed, for example, by injection molding or some other method suitable to the material used. Alternately, other suitable material such as foam or composites of various materials may be used. The wall thickness of the body 512 and tail 514 may also be arranged so as to position the center of gravity of the system 510 directly below its center of buoyancy.

Figure 10F:
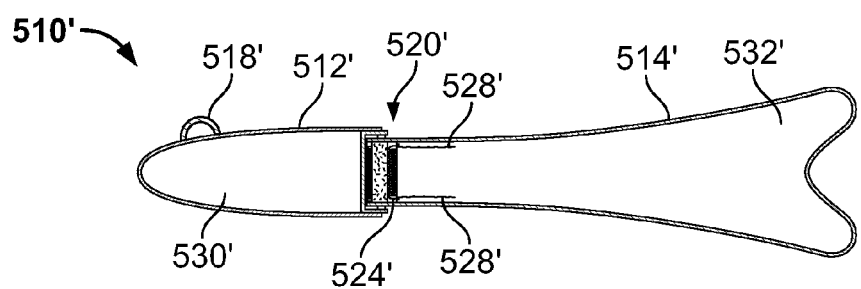
FIG. 10F is a cross-sectional view, which is similar to that of FIG. 10D, of a hydrokinetic energy harvesting system that is a modified version of the one shown in FIG. 10D.

FIG. 10F depicts a hydrokinetic energy harvesting system 510' that is similar to the hydrokinetic energy harvesting system 510 shown in FIG. 10D. The system 510' has a body 512' that is pivotally attached to a tail 514'. The tail 514' is larger in proportion to the body 512' than the tail 514 is to the body 512 in the system 510. A plurality of color varying LEDs 516' are mounted on the tail 514', for purposes that are described hereinbelow. The body 512' has a towing eye 518' for attaching a line to the system 510'. The system 510' has a water-proof micro-generator 520' positioned in the body 512', the micro-generator 520 having a stator 522' and rotor windings 524' like those of the micro-generator 520 of FIG. 10E.

In operation, the systems 510, 510' may be sized and shaped in the form of fishing lures with triple pronged hooks attached to them. The systems 510, 510' may used for fishing, with a negative buoyancy embodiment used for bottom fishing, a neutral buoyancy embodiment used for intermediate depth fishing, and a positive buoyancy embodiment used for surface fishing. More particularly, when a fishing line is attached to the towing eye 518, 518' of the body 512, 512' and system 510, 510' is towed by a boat or hand-pulled or jigged by a fisherman, turbulent flow of water along the body 512, 512' and tail 514, 514' causes the tail 514, 514' to flutter. The fluttering tail 514, 514' oscillates the rotor windings 524, 524', and the oscillating rotor generates electromagnetic force (emf) that varies in strength and polarity. The varying emf causes the LEDs to luminescence with varying intensity and color. The luminescence attracts fish which may bite on system 510 and become hooked thereon.

It should be appreciated that the present invention provides numerous advantages over the prior art discussed above. For instance, the system 10, 110, 210, 310, 410, 510 may be utilized in various mediums, such as water, fuel, oil, industrial effluent, air or gas, and is scalable in size and power for a wide range of applications, including small, remote sensors or larger, grid-tied services. The system 10, 110, 210, 310, 410, 510 is able to generate output in low flow, low head and narrow channel conditions. Maintenance may be accomplished by quick change-outs of the vanes 16 of the system 10, 110, 210, 310, 410, 510. This enables the system 10, 110, 210, 310, 410, 510 to be deployed in a wide range of applications, such as fish hatcheries, aquaculture facilities, camping/backpacking, toys, effluent systems, sewage plants, farms, etc. The functioning of the system 10, 110, 210, 310, 410, 510 also has minimal affect on wildlife.

Figure 11:
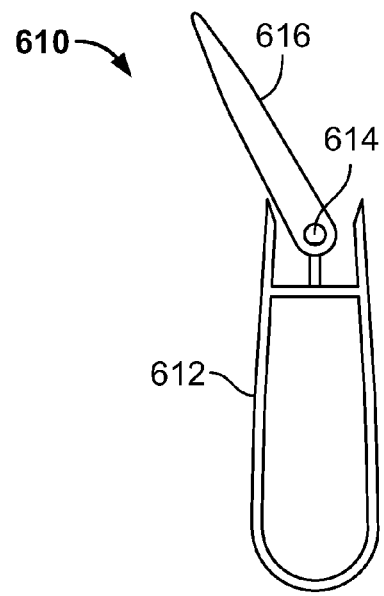
FIG. 11 is a cross-sectional view of a vane having multiple sections.

It should be noted that the present invention can have numerous modifications and variations. For instance, a multi-piece vane 616 having the cross-sectional shape shown in FIG. 11 may be utilized. More particularly, the multi-piece vane 610 has a primary blade 612 which has a pivot-pin 614, and a secondary blade 616 which is pivotally mounted on the pivot-pin 614. In some embodiments of vane 610, the pivot-pin would be separate and distinct from any pin used to connect the vane 610 to an analog of the support structure 18 of FIG. 1 or an energy conversion and/or control unit (e.g., the energy conversion and control unit 14 of FIG. 1) The secondary blade 616 can generate an additional "whipping" action on the primary blade 612. The secondary blade 616 may alternately be fabricated out of flexible material to provide an additional flutter effect to the secondary blade 616 and by reaction, to the primary blade 612. The secondary blade 616 can increase torque output and power generation, and can act as an exciter-element to restart the multi-piece vane 616 when it stalls.

Figure 12:
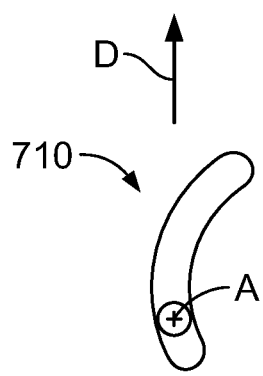
FIG. 12 is a schematic illustration of the vane shown in FIG. 3I, which is positioned downstream from a flow-disturbing device.
Figure 12:
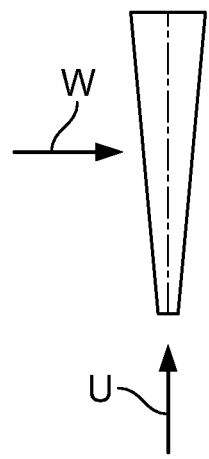

In another example of a modification of the present invention, with reference to FIG. 12, a flow-disturber W (e.g., a wedged shaped object) may be inserted in the upstream flow U. In this example the vane 710 is shown positioned downstream of the flow-disturber W. The flow-disturber W increases the turbulence in the upstream flow U, which inhibits its stalling.

In various other embodiments of the present invention, the system 10, 110, 210, 310, 410, 510 may utilize a piezoelectric generator (not shown), for the direct conversion of kinetic energy to electrical energy as an alternative to the electromagnetic device 60 of FIG. 4. A piezoelectric generator uses the piezoelectric effect that converts mechanical strain, such as the bending of a piezoelectric plate, into electromagnetic force (emf).

In other embodiments of the present invention, the system 310 of FIGS. 8A-8D may be adapted so that, in addition to the light 319 providing illumination, the system 310 can be used for charging electrical devices or powering small electrical devices. This can be accomplished by providing appropriate electrical power conditioners, known in the art, between the micro-generator 342 or storage battery 344 and an electrical connector which, in turn, could be attached to the electrical power conditioners by a power cord that may be stored in the system 310 when not in use.

In other embodiments of the present invention, the system 410 of FIGS. 9A and 9B may be scaled down in size and adapted for implantation in a blood vessel of an animal (which could be a human being). In such embodiments, the system 410 may harvest energy from the flow of blood flowing through the cardiovascular system of the animal. The emf generated by the system 410 may be wired to sensors or electronic devices implanted in the person in order to power such devices without the need of batteries.

In other embodiments, the micro-generator 520 and the LEDs 516 of system 510 of FIGS. 10A-10F may be integrated into the body of a flexible conventional molded-polymer fish-shaped fishing lure (not shown), thereby replacing the separate body 512 and tail 514 with a conventional one-piece flexible molded fish-shaped body. In this embodiment, the undulating motion of the fish-shaped molded body replaces the fluttering motion of the tail 514. In another embodiment, the system 510 may be sized and shaped in the form of a pool toy without a hook 518. This embodiment is larger then the fishing lure so that it may be hand pushed or pulled in the water of the pool to produce fascinating luminescent displays.

It will be understood that the embodiments described herein are merely exemplary and that a person skilled in the art may make many variations and modifications, including those described hereinabove, without departing from the spirit and scope of the invention. For instance, all such variations and modifications are intended to be included within the scope of the invention as defined in the appended claims.

What is claimed is:

1. An adaptive hydrokinetic energy harvesting system, comprising:
    a first blade having a first leading end, a first trailing end opposite said first leading end, and a first part of an electrical power generating means for generating electrical current from torque, said first part being affixed to said first trailing end; and
    a second blade having a hydrofoil cross-section, a second leading end, a second trailing end opposite said second leading end, and a second part of said electrical power generating means affixed to said second leading end, wherein said second leading end of said second blade is movably attached to said first trailing end of said first blade, said first and second blades being arranged such that turbulent fluid flow from said first leading end of the said first blade to said second trailing end of said second blade causes said second blade to oscillate relative to said first blade thereby generating torque, and said first and second parts of said electrical power generating means cooperating to convert the generated torque to electrical current.

2. The adaptive hydrokinetic energy harvesting system of claim 1, wherein said first blade has a second hydrofoil cross-section.

3. The hydrokinetic energy harvesting system of claim 1, wherein said electrical power generating means includes a piezoelectric element and a means for mechanically inducing an electrical potential across said piezoelectric element in response to the generated torque, one of said first and second parts of said electrical power generating means including said piezoelectric element.

4. The hydrokinetic energy harvesting system of claim 1, wherein said electrical power generating means include an electromagnetic device having a stator and a rotor, wherein one of said first and second parts of said electrical power generating means includes said stator and the other of said first and second parts of said electrical power generating means includes said rotor.

5. The hydrokinetic energy harvesting system of claim 1, wherein said system has an electrically-powered illuminating device exposed at an exterior surface thereof, said electrically-powered illuminating device being electrically connected to said electrical power generating means such that said electrical power generating means supplies electrical power to said electrically-powered illuminating device.

6. The hydrokinetic energy harvesting system of claim 1, wherein said system is adapted to be towed through a fluid medium with said first leading end being forwardmost, thereby generating turbulent fluid flow from said first leading end of said first blade to said second trailing end of said second blade.

7. The hydrokinetic energy harvesting system of claim 6, wherein said system is adapted for use as a fishing lure.

\* \* \* \* \*